United States Patent
Kees et al.

(10) Patent No.: US 9,677,486 B2
(45) Date of Patent: Jun. 13, 2017

(54) METHOD OF CONTROLLING A TURBOCHARGED ENGINE

(71) Applicant: Ford Global Technologies, LLC, Dearborn, MI (US)

(72) Inventors: Donatus Andreas Josephine Kees, Billericay (GB); Anthemios Philemon Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/882,080

(22) Filed: Oct. 13, 2015

(65) Prior Publication Data

US 2016/0108835 A1 Apr. 21, 2016

(30) Foreign Application Priority Data

Oct. 16, 2014 (GB) .................................. 1418323.0

(51) Int. Cl.
*F02D 41/00* (2006.01)
*F02D 41/12* (2006.01)
(Continued)

(52) U.S. Cl.
CPC ..... *F02D 41/0087* (2013.01); *F02D 41/0007* (2013.01); *F02D 41/126* (2013.01);
(Continued)

(58) Field of Classification Search
CPC .... F02D 17/02; F02D 41/0087; F02D 41/123; F02D 13/06; F02D 17/00; F02D 17/023;
(Continued)

(56) References Cited

U.S. PATENT DOCUMENTS 4,274,382 A * 6/1981 Sugasawa ........... F02D 41/0087
123/198 F
4,694,796 A * 9/1987 Mori ..................... F02D 41/123
123/325
(Continued)

FOREIGN PATENT DOCUMENTS

EP 2799696 A2 11/2014
GB 2430708 A 4/2007
(Continued)

OTHER PUBLICATIONS

Intellectual Patent Office, Combined Search and Examination Report of GB1418323.0, Mar. 23, 2015, United Kingdom, 6 pages.

*Primary Examiner* — Hung Q Nguyen
*Assistant Examiner* — Xiao Mo
(74) *Attorney, Agent, or Firm* — Julia Voutyras; McCoy Russell LLP (57) ABSTRACT

A method of controlling a motor vehicle having a turbocharged engine is disclosed in which deactivation of cylinders of the engine is controlled to prevent the rotational speed of a turbocharger of the engine falling below a predefined limit TA, TB. Following commencement of a coast down of the motor vehicle all cylinders of the engine are first deactivated so as to maximise energy recuperation from the motor vehicle by a belt integrated starter generator driveably connected to the engine. However, if the speed of the turbocharger reaches one of the speed limits TA, TB at least one cylinder of the engine is reactivated to keep the turbocharger spinning.

20 Claims, 4 Drawing Sheets

(51) Int. Cl.
*F02D 17/02* (2006.01)
*F02B 37/12* (2006.01)

(52) U.S. Cl.
CPC ...... *F02B 2037/122* (2013.01); *F02D 17/023* (2013.01); *F02D 2041/0012* (2013.01); *Y02T 10/144* (2013.01)

(58) Field of Classification Search
CPC ................. F02D 17/026; F02D 41/007; F02B 2037/122; F02B 41/00; F02B 41/10; F02B 63/04; F02B 63/042; F02G 5/02; Y02T 10/144
See application file for complete search history.

(56) References Cited

U.S. PATENT DOCUMENTS

| | | | | |
|---|---|---|---|---|
| 5,515,824 | A * | 5/1996 | Yamagishi | F02D 41/123 123/325 |
| 6,276,138 | B1 * | 8/2001 | Welch | F02D 17/02 123/198 F |
| 8,562,484 | B1 | 10/2013 | Nedorezov et al. | |
| 2005/0090365 | A1 * | 4/2005 | Tamai | B60K 6/48 477/5 |
| 2006/0107919 | A1 * | 5/2006 | Nishi | F02D 13/06 123/198 F |
| 2007/0293368 | A1 * | 12/2007 | Tamai | F02D 41/0205 477/107 |
| 2008/0119327 | A1 * | 5/2008 | Kitaori | F16H 61/0213 477/120 |
| 2010/0314186 | A1 | 12/2010 | Ma | |
| 2014/0365051 | A1 | 12/2014 | Gussen et al. | |

FOREIGN PATENT DOCUMENTS

| | | |
|---|---|---|
| GB | 2486708 A | 6/2012 |
| GB | 2507061 A | 4/2014 |
| JP | 2008222033 A | 9/2008 |

\* cited by examiner

METHOD OF CONTROLLING A TURBOCHARGED ENGINE

CROSS REFERENCE TO RELATED APPLICATIONS

The present application claims priority to United Kingdom Patent Application No. 1418323.0, filed Oct. 16, 2014, the entire contents of which are hereby incorporated by reference for all purposes.

FIELD

This disclosure relates to the control of a turbocharged engine of a motor vehicle and in particular to the control of deactivation and reactivation of at least one cylinder of such an engine.

BACKGROUND/SUMMARY

A motor vehicle may include a belt integrated starter-generator (BISG) that can be used as a motor to start the engine of the motor vehicle, operate as a generator to generate electrical energy for use by the motor vehicle and in some cases assist with driving of the motor vehicle by for example providing torque assist to the engine.

The BISG may also be used to recuperate energy from the motor vehicle during a coast down of the motor vehicle.

A coast down is a situation where the operator of the motor vehicle is not requesting the delivery of torque from the engine.

In order for energy to be recuperated by the BISG the engine always has to turn for the BISG to recuperate kinetic energy and with the driveline between the engine and the road wheels remain intact and connected/engaged.

In order to increase the kinetic energy that can be recovered by the BISG and therefore increase fuel economy, engine friction may be decreased to a lowest possible value. One method to reduce engine friction is cylinder deactivation. Test work has indicated that engine friction can be almost halved if all of the cylinders of an engine are deactivated (e.g., by deactivating intake and exhaust valves of the engine cylinders) during a coast down. Therefore the deactivation of all cylinders of an engine may produce significant fuel economy improvements due to the increased energy that can be recuperated by the BISG into the electrical storage device (battery) of the motor vehicle by reducing the engine friction losses.

However, the inventors herein also recognize that in the case of a turbocharged engine the deactivation of all of the cylinders of the engine during a coast down event will result in several problems.

Firstly, the speed of the turbocharger will rapidly drop during the deactivation of some or all cylinders due to the reduction or lack of gas flow through the engine. If the deactivation extends for a long period of time, the turbocharger may eventually stop rotating and this may lead to a delay until torque is delivered to the driver when the coast down ends and the driver requests torque from the engine.

Secondly, if a turbocharger stops completely its durability is impaired due to the loss of hydrodynamic pressure in the bearings of the turbocharger.

Thirdly, if a turbocharger is stopped there will be a very high acceleration of the turbocharger when torque is eventually demanded and this may produce high stress, particularly in the blades of the turbine of the turbocharger and increase the rate of fatigue of the blades of the turbine wheel. This may lead to a premature fracture of one or more blades of the turbocharger with undesired consequences to the turbocharger and potentially the engine.

In some examples approach are described herein that may in part provide a method of controlling the operation of a turbocharged engine of a motor vehicle having a belt integrated starter generator used for recuperating energy from the motor vehicle that provides improved energy recuperation from the motor vehicle with a reduced risk of damage occurring to the turbocharger.

In one example, a method of controlling a turbocharged engine of a motor vehicle having a belt integrated starter-generator driveably connected to the engine to selectively recuperate energy from the motor vehicle during a coast down of the motor vehicle wherein the method comprises deactivating a predefined number of cylinders of the engine when a coast down event commences and energy recovery is required, operating the belt integrated starter-generator as a generator to recuperate energy from the motor vehicle, comparing an indication of current speed of the turbocharger with a predefined minimum turbocharger speed limit and reactivating at least one cylinder of the engine if the indicated speed of the turbocharger is less than the predefined speed limit.

The predefined number of cylinders may be all of the cylinders that are equipped with a cylinder deactivation mechanism. Advantageously, all of the cylinders of an engine are deactivatable if the energy recuperation is to be maximised.

The method may further comprise maintaining the cylinders of the engine deactivated if the indicated speed of the turbocharger is above the predefined turbocharger speed limit, the coast down event is continuing and energy recovery is still required.

The method may further comprise operating at least one cylinder of the engine in an active state when the coast down event ends.

The number of cylinders operated in the active state may be based upon the magnitude of the torque demand for the engine.

There may be two predefined turbocharger speed limits, a high turbocharger speed limit for use when cylinders of the engine are first deactivated and a lower turbocharger speed limit for use after at least one cylinder of the engine has been reactivated.

The method may further comprise increasing the number of cylinders reactivated in an iterative manner to maintain the turbocharger speed above the lower turbocharger limit.

According to a second aspect there is provided a motor vehicle having a turbocharged engine, a belt integrated starter-generator driveably connected to the engine to selectively recuperate energy from the motor vehicle during a coast down of the motor vehicle, an energy storage system to store energy recuperated by the belt integrated starter-generator, a cylinder deactivation system to selectively deactivate the cylinders of the engine, an electronic controller to control the operation of the belt integrated starter-generator, the energy storage system and the cylinder deactivation system in response to an input indicative of the speed of rotation of the turbocharger and an input indicative of the operating state of the motor vehicle wherein, when the input indicative of the operating state of the motor vehicle indicates that a coast down state is present, the controller is operable to use the belt integrated starter-generator as a generator to recuperate energy from the motor vehicle, use the cylinder deactivation system to deactivate a predefined number of cylinders of the engine when a coast down event commences and energy recovery is required and is further operable to use the cylinder deactivation system to reactivate at least one cylinder of the engine if the input indicative of the speed of rotation of the turbocharger indicates that the speed of the turbocharger is less than a predefined speed limit.

The predefined number of cylinders may be all of the cylinders that are equipped with a cylinder deactivation mechanism.

The electronic controller may be operable to maintain the cylinders of the engine that have been deactivated in the deactivated state provided the input indicative of the speed of rotation of the turbocharger indicates that the turbocharger speed has not dropped below the predefined turbocharger speed limit and the input indicative of the operating state of the motor vehicle indicates that a coast down state is still present and energy recovery is still required.

The electronic controller may be further operable to operate at least one cylinder of the engine in an active state when the input indicative of the operating state of the motor vehicle indicates that the coast down event has ended.

The number of cylinders operated by the electronic controller in the active state may be based upon the magnitude of a torque demand for the engine.

There may be two predefined turbocharger speed limits stored in the electronic controller, a high speed limit for use when the cylinders of the engine are first deactivated and a second lower speed limit for use after at least one cylinder of the engine has been reactivated.

The electronic controller may be operable to increase the number of cylinders reactivated in an iterative manner to maintain the turbocharger speed above the lower turbocharger limit.

It should be understood that the summary above is provided to introduce in simplified form a selection of concepts that are further described in the detailed description.

It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
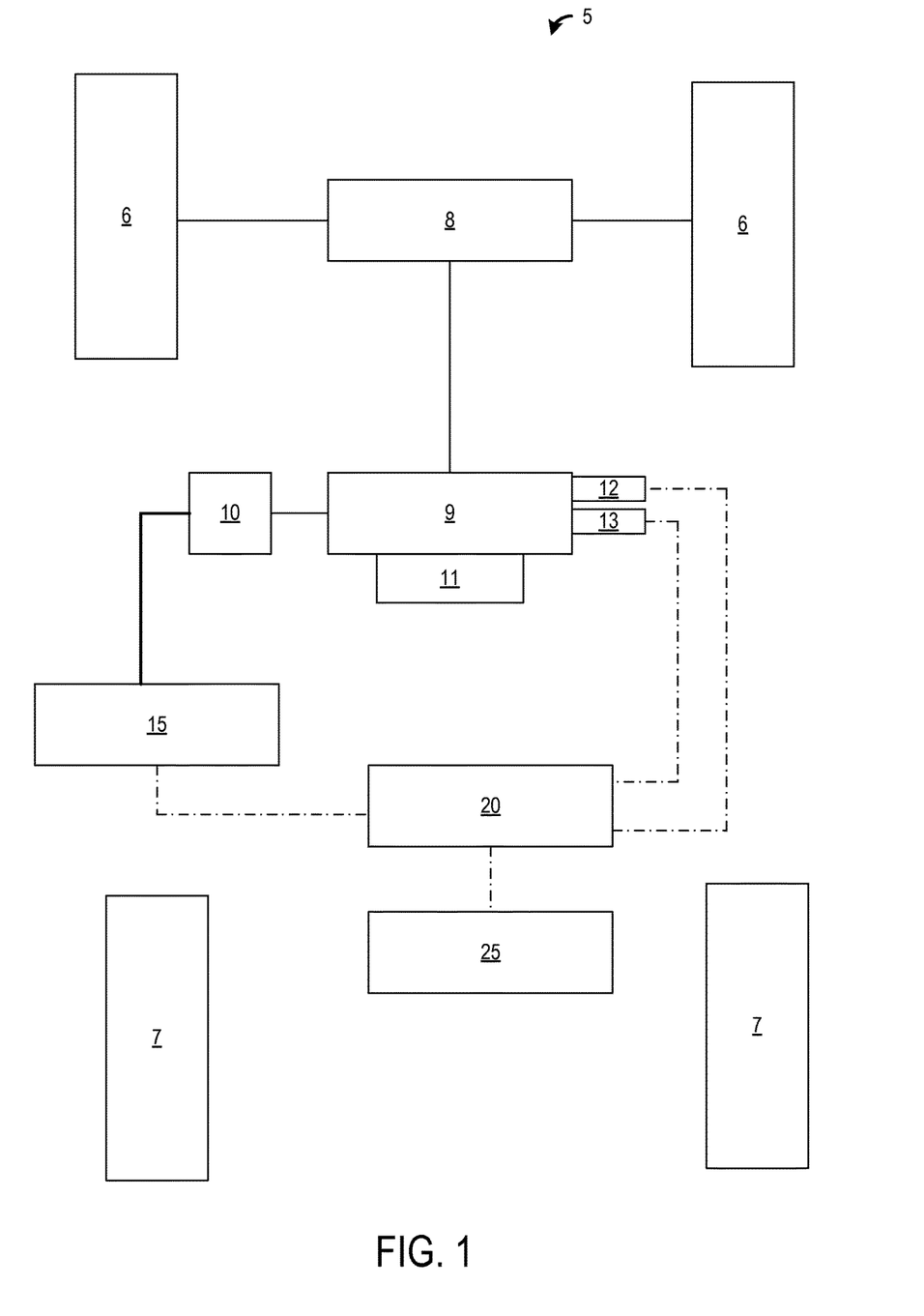
FIG. 1 is a schematic view of a motor vehicle having a turbocharged engine.

With reference to FIG. 1 there is shown a motor vehicle 5 having four wheels 6, 7 of which the front wheels 6 are driven wheels that is to say, in this case the motor vehicle 5 is a front wheel drive motor vehicle 5. Rear wheels 7 are rotated dependent upon a propulsion of the vehicle 5.

The motor vehicle 5 has an engine 9 driving the front wheels 6 by means of a driveline 8 comprising of a clutch, a gearbox and a differential none of which are shown in detail.

The engine 9 is a forced induction engine having a turbocharger 11 including a turbine to recuperate energy from an exhaust flow from the engine 9 and a compressor driven by the turbine as is well known in the art.

The engine 9 is drivingly connected by a belt drive to a motor-generator forming a belt integrated starter-generator (BISG) 10. The BISG 10 can be operated as a motor to start the engine 9 or to provide a power assist to the engine 9 or as a generator to generate electrical power for storage in an energy storage system 15. The energy storage system includes at least one electrical energy storage device such as a battery and a controller 20 to control charging and discharging of the battery and operation of the BISG 10.

The engine 9 is in this case a diesel engine and a fuel injection system 13 is provided to supply the fuel to the engine 9 in response to a torque demand from a driver of the motor vehicle 5. It will be appreciated by someone skilled in the art that the engine may be a spark ignited engine and may include a spark ignition system.

The engine 9 is fitted with a cylinder deactivation system 12 that can be of any suitable type (e.g., a hydraulic lash adjuster). To deactivate a cylinder of an engine the valves associated with the cylinder of the engine are kept closed so as to prevent the flow of air through the cylinder. In some embodiments of cylinder deactivation the inlet valves are kept closed in some embodiments of cylinder deactivation the exhaust valves are kept closed, in other embodiments the exhaust and inlet valves are kept closed. The cylinder deactivation system is not limited to any particular cylinder deactivation arrangement or to any particular type of deactivation system. For a spark ignited engine, the inlet and exhaust valves may be kept open or closed while one or more of a spark and fuel injection are disabled.

The cylinder is deactivated when the valves of the cylinder are operated to prevent the flow of air through the cylinder. A cylinder is reactivated when it has been placed into an 'inactive' state in which the valves operate normally so that the flow of air through the cylinder is not prevented. A cylinder is active when the flow of air through the cylinder is not prevented and fuel or spark is being provided to the cylinder to provide torque from the cylinder.

The cylinder deactivation system 12 may form part of a valve timing and control system that is further operable to vary the valve timing of the engine 9 during normal running of the engine 9.

An electronic controller 20 is provided to control the operation of the BISG 10 (via in this case the energy storage system), the cylinder deactivation system 12 and the fuel injection system 13 in response to a number of inputs 25.

It will be appreciated that the disclosure is not limited to the specific electronic architecture shown and that alternative electronic architectures could be used. For example, the control of the BISG 10, the fuel injection system and the cylinder deactivation system could be done in a single central control unit or there could be a number of control units and the electronic controller 20 only determines when to deactivate and reactivate the cylinders of the engine 9 and provides signals indicative of this to other control units of the motor vehicle.

For the purpose of this disclosure, two principal inputs are included as part of the inputs 25 to the electronic controller 20. The first of these inputs is an input indicative of the operating state of the motor vehicle that is used to indicate when a coast down state is present. This input may comprise an output from a sensor used to sense accelerator pedal position and an output from a sensor indicating current vehicle speed.

Coast down may occur when the motor vehicle 5 is moving with the driveline 9 between the engine 9 and the driven road wheels 6 is engaged and there is no request for engine torque from the driver.

It will be appreciated that various other inputs could also be used to determine whether coast down is occurring such as whether a brake pedal is being pressed, whether the clutch is engaged, whether a gear is selected and whether the speed of the motor vehicle is between predefined limits and that the determination as to whether coast down is occurring could also take account of such factors.

The second input of the inputs 25 is an input indicative of the speed of rotation of the turbocharger 11.

In an example embodiment, the speed of the turbocharger 11 is sensed by a speed sensor that measures the rotational speed of the turbocharger and provides an output indicative of the measured speed. For example and without limitation, a speed sensor could be positioned to measure the rotational speed of the compressor of the turbocharger 11 and provide an output indicative of the rotational speed of the turbocharger 11 to the electronic controller 20.

However, there are various other methods of providing an indication of turbocharger rotational speed and the disclosure is not limited to any particular method. For example and without limitation, the indication of turbocharger speed could be obtained from a look up table based upon experimental data, an acceleration sensor located on the turbocharger 11 that, with suitable signal filtering and signal conditioning, can provide an indication of the rotational speed of the turbocharger 11, or an acceleration sensor located on the cylinder block of the engine 9 that, with suitable signal filtering and signal conditioning, can provide an indication of the rotational speed of the turbocharger 11.

When the input indicative of the operating state of the motor vehicle 5 indicates that a coast down state is present, the controller 20 is operable to use the BISG 10 as a generator to recuperate energy from the motor vehicle 5. The electronic controller 20 is also operable to use the cylinder deactivation system 12 to deactivate all of the cylinders of the engine 9 that are equipped with a cylinder deactivation mechanism. It will be appreciated that during coast down of the motor vehicle 5 the fuel injection system 13 is operated so as to supply no fuel to the engine 9.

The motor vehicle 5 is operated in this fully deactivated manner so long as the coast down continues provided the rotational speed of the turbocharger 11 (turbocharger speed T) remains above a first upper speed limit TA. In practice, operation of the BISG 10 as a generator may need to be terminated if, for example, there is no spare capacity to store electrical energy in the energy storage system 15. In this way, under some conditions, the cylinders of the engine may be deactivated in response to the coast down event while the BISG 10 is decoupled or no longer recuperating energy from the motor vehicle 5. As an example, the cylinders may be deactivated and the BISG 10 may be decoupled in response to a turbo speed deceleration. If the turbo speed gradually decreases to a lower limit (e.g., below a critical turbocharger speed TC), then the BISG 10 may be decoupled to prevent recharging while all the deactivated cylinders may remain deactivated. Alternatively, if the turbo speed rapidly decreases toward the critical turbocharger speed TC, then the BISG 10 may be decoupled and one or more of the deactivated cylinders may be activated in order to increase the turbocharger speed and maintain its speed above the TC. The number of cylinders being activated may be proportional to a rate of turbocharger speed deceleration, wherein a greater number of cylinders are activated in response to a higher rate of deceleration.

The first upper speed limit TA is a rotational speed of the turbocharger 11 that is set sufficiently above the critical turbocharger speed TC that, even if the turbocharger 11 is rotating at maximum speed when the cylinder deactivation occurs, the momentum of the slowing turbocharger 11 will not cause the turbocharger speed to overshoot the critical turbocharger speed TC when at least one cylinder of the engine 9 is reactivated when the upper speed limit TA is traversed. The critical turbocharger speed TC is a rotational speed below which it has been determined that in response to a request for a high level of torque one or more of unacceptable delay in turbocharger spin up and unacceptably high blade stress will occur. It will be appreciated that a time delay occurs between a decision to reactivate a cylinder and the effect of that decision on the rotational speed of the turbocharger 11 produced by increased air flow through the engine 9 due to gas dynamics, mechanical inertia, and signal processing delays.

The electronic controller 20 is operable to use the cylinder deactivation system 12 to reactivate at least one cylinder of the engine 9 into the inactive state if the input indicative of the speed of rotation of the turbocharger indicates that the turbocharger speed T is less than the predefined upper speed limit TA provided the coast down is continuing. As previously referred to, the reactivation of a cylinder into an inactive state allows air to be pumped by the respective cylinder. In one example, only one cylinder of the engine is reactivated however in the case of an engine having a large number of cylinders and a single turbocharger it may be desired to reactivate more than one cylinder. Desired actions may include requests generated by the control system responsive to operator input, sensed operating conditions, etc. For example, a desired engine output may include a requested engine output determined by the controller responsive to a sensed pedal position of the vehicle operator.

If the reactivation of the at least one cylinder increases the speed of the turbocharger 11 to a level above that set for the upper speed limit TA then the current number of cylinders will remain deactivated so long as that situation remains and the coast down is continuing. However, if the turbocharger speed T continues to fall and traverses a predefined secondary lower turbocharger speed limit TB then the electronic controller 20 is operable to reactivate one more cylinders of the engine 9 so as to prevent the critical turbocharger speed TC being reached.

It will be appreciated that the initial reactivation of at least one cylinder will affect the deceleration of the turbocharger 11 as it slows so as to reduce the rate of deceleration. This reduced rate of deceleration of the turbocharger 11 considerably reduces the risk of overshooting the critical turbocharger speed TC. This allows the lower turbocharger speed limit TB to be set much closer to the critical turbocharger speed TC than the upper speed limit TA. If only one speed limit were to be set then for durability and performance reasons it would need to be set at the upper speed limit TA level, by having two speed limits TA, TB it is possible to allow the turbocharger 11 to slow to a speed closer to the critical turbocharger speed TC without risking damage or poor spin-up from occurring. Therefore, potentially more cylinders can remain deactivated during the coast down or the reactivation of cylinders can be delayed for a longer period of time. In both cases this increases the amount of energy that can be recuperated by the BISG 10 during the coast down due to the reduced engine losses when cylinders are deactivated.

Additionally or alternatively, no cylinders of the engine may be deactivated for a coast down initiated at a lower vehicle speed. This may be due to an increased likelihood for a tip-in to occur resulting in an increased torque demand. In this way, the turbo speed may be kept above the lower turbocharger speed limit TB in order to meet a resulting driver demand for a coast down event at a lower vehicle speed. Furthermore, the higher turbocharger speed limit TA may be decreased in order to decrease a number of cylinder deactivation opportunities at lower vehicle speeds. However, for a coast down from a higher speed, deactivation of the cylinders is enabled based on the turbocharger speed. As an example, the higher turbocharger speed limit TA may be increased at high vehicle speeds, thus allowing a greater range, and therefore more opportunities, for cylinder deactivation.

If at any time the coast down ends then operation of the deactivation system 12 reverts to a normal mode in which cylinders are deactivated rendered inactive or activated based upon torque demand and the specific configuration of the systems and control used. Therefore at the end of the coast down period all of the cylinders may be activated if a high torque demand is being requested or only some of the cylinders of the engine are activated if the torque demand is low. In some cases the number of cylinders deactivated will not change at the end of the coast down period and the only change will be the introduction of fuel into the already reactivated cylinders so as to render the cylinder active so that the cylinder can produce the demanded torque.

Figure 3:
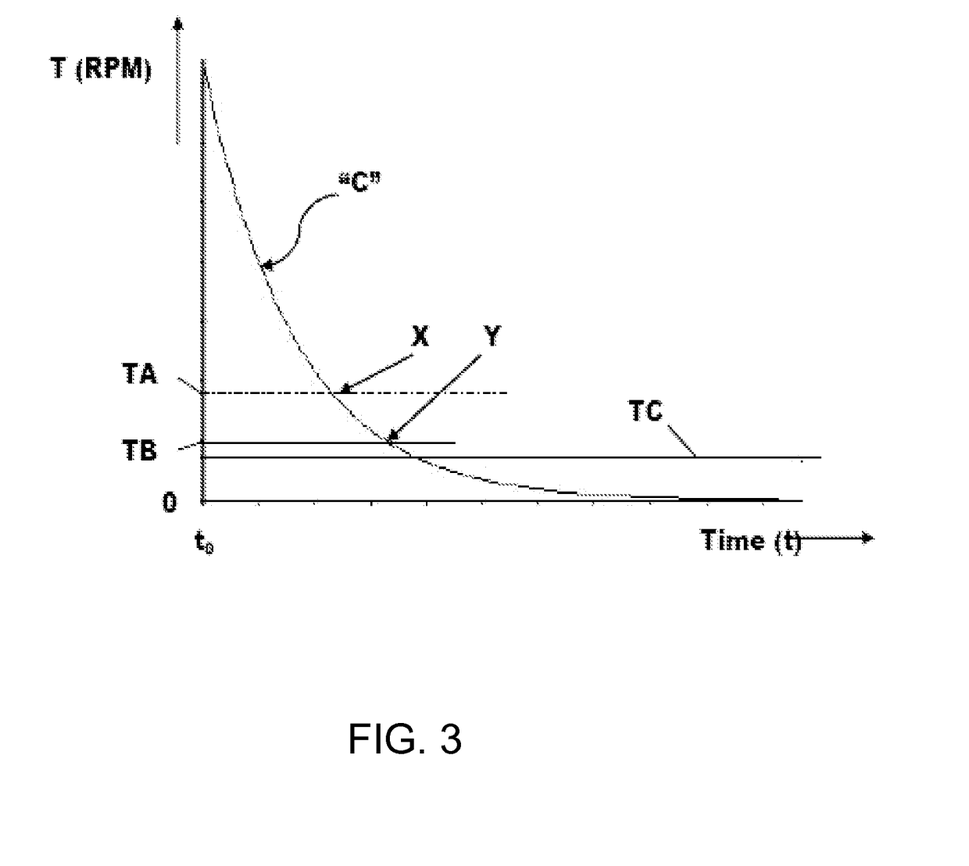
FIG. 3 is a graph showing the relationship between turbocharger speed and time for a turbocharger when all of the cylinders of the engine are deactivated.

FIG. 3 shows a typical curve "C" of turbocharger speed T versus time t representing the deceleration of a turbocharger when all cylinders of an engine to which it is connected are deactivated. Point X indicates a rotational speed T substantially equal to the upper turbocharger speed limit TA. Point Y indicates a rotational speed T substantially equal to the lower turbocharger speed limit TB. The critical turbocharger speed TC is indicated by a horizontal line set above a zero speed line coincident with the time axis indicating that the critical turbocharger speed is rotational speed T greater than zero.

Figure 2A:
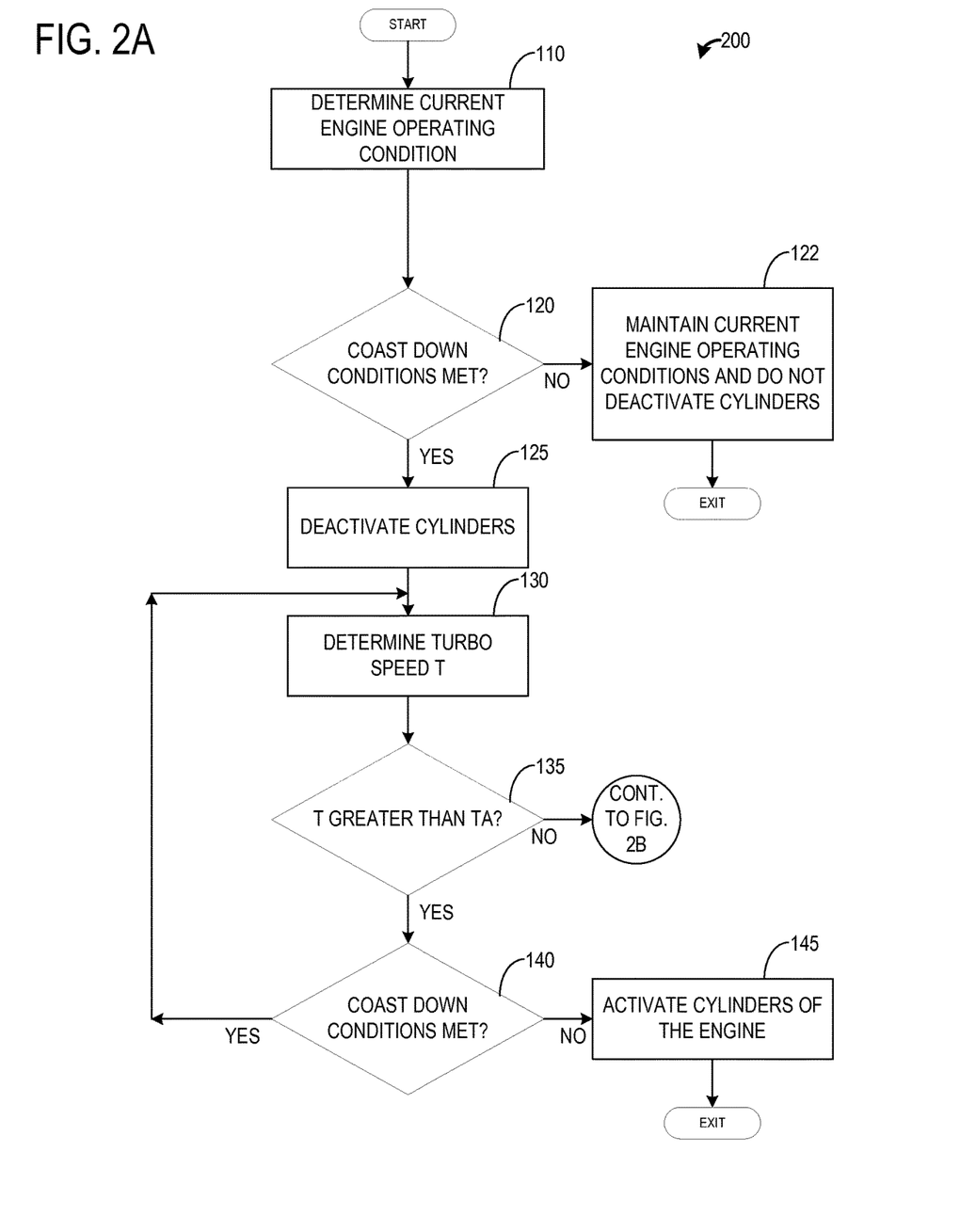
FIGS. 2A and 2B are a flow diagram of a method for controlling a turbocharged engine of a motor vehicle having a belt integrated starter generator (BISG) used for recuperating energy from the motor vehicle.
Figure 2B:
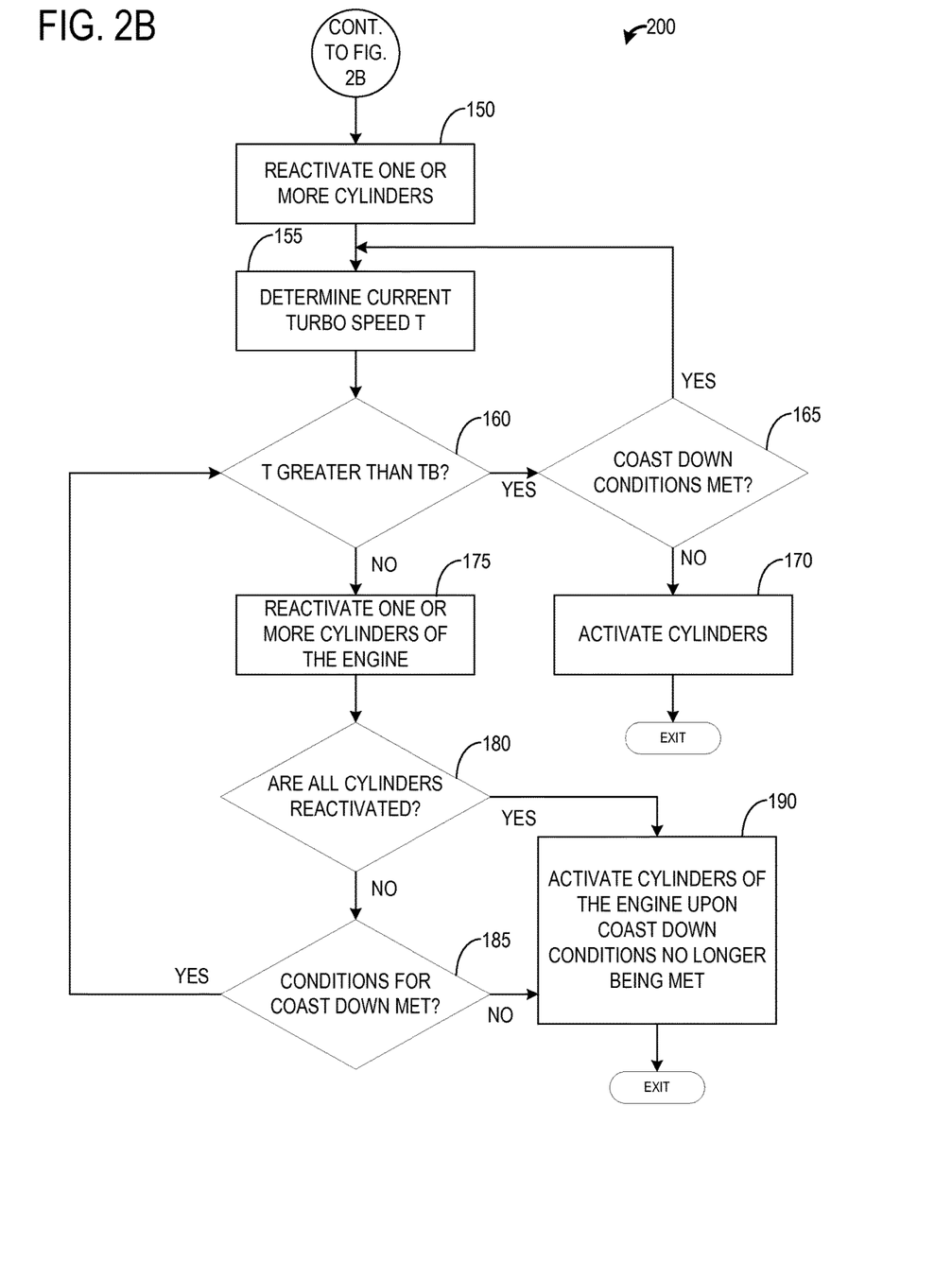

With reference to FIGS. 2A and 2B there is shown a method of controlling a turbocharged engine of a motor vehicle having a BISG to recuperate energy during a coast down event such as the turbocharged engine 9 and BISG 10.

The method 200 starts at 110 which includes determining a current engine operating condition. The current engine operating condition may include one or more of an engine load, engine speed, vehicle speed, pedal position, and air/fuel ratio. At 120 to the method determines whether the conditions for a coast down event are met. In order for the engine 9 to be recuperated it remains connected via the drivetrain 8 of the motor vehicle 5 to at least one driven road wheel 6 of the motor vehicle 5. However, the conditions for a coast down can be considered to be that there is no request for torque from the engine 9 and that the motor vehicle 5 is travelling at a sufficient speed that kinetic energy can usefully be recuperated from it by the BISG 10.

If the conditions for coast down are not met then the method proceeds to 122 to maintain current engine operating conditions and does not deactivate any cylinder in order to meet a torque demand from a driver of the motor vehicle 5.

However, if the conditions for a coast down have been met then the method advances to 125 where all of the cylinders of the engine 9 that are equipped with a cylinder deactivation mechanism are deactivated in order to maximise the opportunity for energy recuperation by the BISG 10. The method then advances to 130 to ascertain the turbocharger speed T. As previously discussed this can be achieved in any suitable manner such as, for example, direct measurement of the turbocharger speed T using a speed sensor. As one example, a greater number of cylinders may be deactivated as the turbo speed at which the tip-out occurs increases. Additionally or alternatively, the cylinders may be deactivated for a greater duration of time as the turbo speed at which the tip-out occurs increases.

At 135 the current turbocharger rotational speed T is compared with a predefined upper turbocharger speed limit TA. The upper turbocharger speed limit TA is a rotational speed of the turbocharger 11 that is set sufficiently above a critical turbocharger speed TC that, even if the turbocharger 11 is rotating at maximum speed when the cylinder deactivation occurs, the momentum of the slowing turbocharger 11 will not cause the turbocharger speed T to overshoot the critical turbocharger speed TC when at least one cylinder of the engine 9 is reactivated. As before, the critical turbocharger speed TC is a rotational speed below which it has been determined that one or more of unacceptable delay in turbocharger spin up and unacceptably high blade stress will occur.

If the turbocharger speed T is greater than TA the method returns to 130 and the turbocharger speed T is re-ascertained or re-measured by a speed sensor. It will be appreciated that in practice the turbocharger speed T may be continuously monitored. Before returning to 130 it is first checked at 140 to confirm that the conditions for coast down are still present and if, energy recovery is desired. If they are, then the method returns to 130. If the conditions for coast down and energy recovery are no longer present or energy recovery is no longer required, then the method advances to 145 to activate desired number of the cylinders of the engine 9 to meet a current torque demand. In some cases all of the cylinders of the engine 9 are activated and in other cases only some of the cylinders of the engine 9 are activated. To activate a cylinder of the engine the deactivation of the cylinder is stopped and fuel is supplied to the respective cylinder.

Referring back to 135, if the current turbocharger speed T is less than the upper turbocharger speed limit TA the method advances to 150 where at least one cylinder of the engine 9 is reactivated into the inactive state to permit air to be pumped therethrough. Normally only one cylinder is reactivated but more than one cylinder could be reactivated if desired.

From 150 the method advances to 155 to check the current turbocharger speed T and then advances to 160 where the current turbocharger speed T is compared with a predefined lower turbocharger speed limit TB. If the lower turbocharger speed limit TB has been crossed then the reactivation that occurred at 150 has not been sufficient and at least one further cylinder needs to be reactivated into the inactive state to prevent the turbocharger speed T falling below the critical turbocharger speed TC. Therefore if when checked at 160 that the current turbocharger speed T is less than or equal to the lower turbocharger speed limit TB the method will advance to 175 and at least one more cylinders of the engine 9 is reactivated to the inactive state to permit air to be pumped therethrough. However, if the current turbocharger speed T when checked at 160 is determined to be greater than the lower turbocharger speed limit TB the method will advance to 165 to check whether the conditions for coast down are still present and energy recovery is still required.

If, when checked at 165 that, the conditions for coast down and energy recovery are no longer present, then the method advances from 165 to 170 to activate the cylinders of the engine 9 desired to meet a current torque demand. As before to activate a cylinder of the engine the deactivation of the cylinder is halted and fuel is supplied to the respective cylinder. It will be appreciated in some cases a cylinder will already be reactivated (in the inactive state) and thus, only initiating a fuel supply may activate the cylinder.

However, if when checked at 165 that the conditions for coast down are still present and energy recovery is still required, the method returns from 165 to 155 and 155 and 160 are executed again.

Referring back to 175, after reactivation of the at least one cylinder the method advances to 180 to check whether all of the cylinders of the engine have been reactivated and so are inactive. If they are all inactive the method advances to 190 where it will remain until the coast down ends at which point the cylinders of the engine 9 desired to meet a current torque demand are activated. It will be appreciated that because all of the cylinders are already inactive the only condition at 190 to activate a cylinder is to begin to supply fuel to that cylinder.

However, if, when checked in box 180, it is determined that all of the cylinders of the engine 9 are not inactive, that is to say, some of the cylinders are still deactivated, the method advances to 185 to check whether the conditions for coast down are still present and there is still a requirement for energy recovery and, if they are the method returns to 160 to test the current turbocharger speed T against the lower turbocharger speed limit TB. If, when tested at 185 that the coast down or the demand is no longer a need for energy recovery has ended, then the method advances to 190 to activate the cylinders of the engine 9 desired to meet a current torque demand. As before, to activate a cylinder of the engine the deactivation of the cylinder is halted, that is to say it is reactivated, and fuel is supplied to the respective cylinder. It will be appreciated in some cases a cylinder will already be inactive and so the only condition at 190 to activate a cylinder is to begin to supply fuel to the respective cylinder.

Although the disclosure has been described with respect to a diesel engine it will be appreciated that it is not limited to use on a diesel engine and could be used with equal advantage on other types of turbocharged engines such as for example a spark ignited engine. In the case of a spark ignited engine both fuel and a spark are utilized to render a cylinder active. During the deactivated and inactive states no fuel will be supplied to the cylinder but a spark may or may not be provided depending upon the specific system provided.

Although various concepts been described with reference to an embodiment in which all of the cylinders that can be deactivated are initially deactivated it will be appreciated that the number of cylinders deactivated could be a predefined number particularly for engines having a large number of cylinders. For example and without limitation, in the case of an engine having eight cylinders only six cylinders may originally be deactivated whereas all of the cylinders can be deactivated.

It will be appreciated that in the case of some engines not all of the cylinders can be deactivated. For example and without limitation, it may be possible to deactivate only two cylinders of a four cylinder engine.

Advantageously, all cylinders of an engine are deactivatable if the energy recuperation is to be maximised.

It will be appreciated that, when energy recuperation is not required during a coast down, any deactivatable cylinders will normally be placed into the inactive state ready for becoming active when the coast down ends. The method shown in FIGS. 2A and 2B therefore assumes that energy recuperation is required.

It will be appreciated by those skilled in the art that although the disclosure has been described by way of example with reference to one or more embodiments it is not limited to the disclosed embodiments and that alternative embodiments could be constructed without departing from the scope of the disclosure as defined by the appended claims.

In this way, a turbocharged engine may comprise a method for deactivating one or more cylinders to maintain a desired turbocharger speed while also increasing an energy recovery by a BISG to provide electrical energy to an energy storage device. By basing cylinder deactivation on a turbocharger speed and optionally on additional parameters, turbo lag may be reduced, a durability increases, and stress on blades of a compressor upon reintroduction of torque decreases. The technical effect of deactivating cylinders based on a turbo speed is to both increase a turbo durability and/or longevity while increasing an energy recovery.

Note that the example control and estimation routines included herein can be used with various engine and/or vehicle system configurations. The control methods and routines disclosed herein may be stored as executable instructions in non-transitory memory of the controller and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessary to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. The configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a turbocharged engine of a motor vehicle having a belt integrated starter-generator driveably connected to the engine to selectively recuperate energy from the motor vehicle during a coast down of the motor vehicle wherein the method comprises deactivating a predefined number of cylinders of the engine equipped with a cylinder deactivation mechanism when a coast down event commences and energy recovery is desired, wherein the deactivating includes closing one or more valves of the cylinders to prevent a flow of air through the cylinders, operating the belt integrated starter-generator as a generator to recuperate energy from the motor vehicle, comparing an indication of current speed of the turbocharger with an upper turbocharger speed limit and opening valves and permitting the flow of air through at least one of the deactivated cylinders if the indicated current speed of the turbocharger is less than the upper turbocharger speed limit, opening the valves of more than one deactivated cylinders if the indicated current speed is less than a lower turbocharger speed limit, and supplying fuel to each of the deactivated cylinders in response to a torque demand.

2. The method of claim 1, wherein maintaining the cylinders of the engine deactivated when the indicated current speed of the turbocharger is above the lower turbocharger speed limit, the coast down event is continuing and energy recovery is desired includes not fueling the cylinders.

3. The method of claim 2, wherein operating at least one cylinder of the engine in an active state in response to the coast down event ending and energy recovery no longer being desired includes fueling the at least one cylinder.

4. The method of claim 1, further comprising a number of cylinders operated in an active state based upon a magnitude of the torque demand for the engine.

5. The method of claim 4, wherein the lower turbocharger speed limit is closer to a critical turbocharger speed than the upper turbocharger speed limit.

6. The method of claim 5, further comprising opening valves of an increasing number of cylinders in an iterative manner to permit the flow of air therethrough to maintain the turbocharger speed above the lower turbocharger speed limit to prevent the turbocharger speed from reaching the critical turbocharger speed.

7. A motor vehicle, comprising:
a turbocharged engine, a belt integrated starter-generator driveably connected to the engine to selectively recuperate energy from the motor vehicle during a coast down of the motor vehicle, an energy storage system to store energy recuperated by the belt integrated starter-generator, a cylinder deactivation system to selectively deactivate cylinders of the engine, wherein the cylinder deactivation includes closing one or more valves of the cylinders to prevent a flow of air therethrough, an electronic controller to control operation of the belt integrated starter-generator, the energy storage system and the cylinder deactivation system in response to an input indicative of a speed of rotation of a turbocharger and an input indicative of an operating state of the motor vehicle, wherein, when the input indicative of the operating state of the motor vehicle indicates that a coast down state is present, the controller is operable to use the belt integrated starter-generator as a generator to recuperate energy from the motor vehicle, use the cylinder deactivation system to deactivate a predefined number of cylinders of the engine when a coast down event commences and energy recovery is required, and is further operable to use the cylinder deactivation system to open one or more valves of at least one deactivated cylinder of the engine to permit the flow of air therethrough if the input indicative of the speed of rotation of the turbocharger indicates that the speed of the turbocharger is less than an upper turbocharger speed limit, and where valves of one or more deactivated cylinders are opened in response to the speed of rotation of the turbocharger decreasing below a lower turbocharger speed limit, and supplying fuel to each of the deactivated cylinders in response to a torque request.

8. The motor vehicle of claim 7, wherein the predefined number of cylinders is all of the cylinders that are equipped with a cylinder deactivation mechanism.

9. The motor vehicle of claim 7, wherein the electronic controller is operable to maintain the cylinders of the engine that have been deactivated in a deactivated state provided the input indicative of the speed of rotation of the turbocharger indicates that the turbocharger speed has not dropped below the lower turbocharger speed limit and the input indicative of the operating state of the motor vehicle indicates that a coast down state is still present and energy recovery is still required.

10. The motor vehicle of claim 7, wherein the electronic controller is further operable to operate at least one cylinder of the engine in an active state when the input indicative of the operating state of the motor vehicle indicates that the coast down event has ended or energy recovery is not desired, and where the active state includes opening valves of the at least one cylinder and injecting fuel therein.

11. The motor vehicle of claim 10, wherein a number of cylinders operated by the electronic controller in the active state is based upon a magnitude of a torque demand for the engine.

12. The motor vehicle of claim 7, wherein the flow of air is permitted through more than one cylinder in response to the speed of rotation of the turbocharger falling below the lower turbocharger speed limit.

13. The motor vehicle of claim 7, wherein the electronic controller is operable to increase a number of cylinders with opened valves in an iterative manner to maintain the speed of rotation of the turbocharger above the lower turbocharger speed limit.

14. A method, comprising:
adjusting an operation of one or more cylinders of an engine in response to one or more of a coasting condition being met and an energy recovery being desired;
deactivating one or more cylinders based on one or more coast down conditions being met, where the deactivating includes operating valves of the cylinder to prevent flow of air through the cylinder;
adjusting valves of at least one of the one or more deactivated cylinders to permit the flow of air through the at least one cylinder in response to a turbocharger speed falling below a higher turbocharger speed limit, and further comprising adjusting valves of another one of the deactivated cylinders to permit the flow of air therethrough in response to the turbocharger speed falling below a lower turbocharger speed limit; and
supplying fuel to each of and permitting air to flow through the one or more deactivated cylinders of the engine in response to a torque demand.

15. The method of claim 14, wherein the lower turbocharger speed limit is set closer to a critical turbocharger speed limit than the higher turbocharger speed limit, and where the critical turbocharger speed limit corresponds to a rotational speed below which it has been determined that in response to a request for a high level of torque one or more of unacceptable delay in turbocharger spin up and unacceptably high blade stress occurs.

16. The method of claim 14, wherein air is permitted to flow through and fuel injection is disabled for one or more cylinders in response to one or more of the lower turbocharger speed limit being met, the coasting condition being met and energy recovery being desired by a controller.

17. The method of claim 14, wherein the higher turbocharger speed limit is higher at a higher vehicle speed and the higher turbocharger speed limit is lower at a lower vehicle speed.

18. The method of claim 14, wherein activating a number of cylinders is based on one or more of a torque demand and a rate of turbocharger speed deceleration, and where activating a cylinder includes fueling the cylinder.

19. The method of claim 14, wherein at least one cylinder is active during a coasting condition and the energy recovery being desired.

20. The method of claim 14, further comprising a belt integrated starter-generator driveably connected to the engine and capable of converting kinetic energy of the engine to electrical energy provided to an electric storage device.

\* \* \* \* \*